US012612283B2

(12) United States Patent
Kolb

(10) Patent No.: US 12,612,283 B2
(45) Date of Patent: Apr. 28, 2026

(54) METHOD AND APPARATUS FOR COMMISSIONING A PASSENGER TRANSPORTATION SYSTEM

(71) Applicant: Inventio AG, Hergiswil (CH)

(72) Inventor: Ronny Kolb, Udligenswil (CH)

(73) Assignee: INVENTIO AG, Hergiswil (CH)

( * ) Notice: Subject to any disclaimer, the term of this patent is extended or adjusted under 35 U.S.C. 154(b) by 1344 days.

(21) Appl. No.: 17/309,855

(22) PCT Filed: Dec. 18, 2019

(86) PCT No.: PCT/EP2019/085856
§ 371 (c)(1),
(2) Date: Jun. 24, 2021

(87) PCT Pub. No.: WO2020/136049
PCT Pub. Date: Jul. 2, 2020

(65) Prior Publication Data

US 2022/0073312 A1 Mar. 10, 2022

(30) Foreign Application Priority Data

Dec. 24, 2018 (EP) .................................... 18215821

(51) Int. Cl.
*B66B 1/34* (2006.01)

(52) U.S. Cl.
CPC .......... *B66B 1/3407* (2013.01); *B66B 1/3453* (2013.01); *B66B 1/3461* (2013.01)

(58) Field of Classification Search
CPC .... B66B 1/3407; B66B 1/3453; B66B 1/3461
See application file for complete search history.

(56) References Cited

U.S. PATENT DOCUMENTS 8,463,469 B2 6/2013 Daum et al.
2012/0000733 A1 1/2012 Finschi
(Continued)

FOREIGN PATENT DOCUMENTS

CN 102241348 A 11/2011
CN 204873294 U 12/2015
(Continued)

*Primary Examiner* — Jeffrey Donels
(74) *Attorney, Agent, or Firm* — Shumaker, Loop & Kendrick, LLP

(57) ABSTRACT

A method and an arrangement for commissioning a passenger transportation system includes a mobile device that is computer-controlled from an application and which is configured to exchange data both with a programmable controller controlling the passenger transportation system and with an external database in which configuration information regarding configurations of a plurality of passenger transportation systems is stored. The method steps are: retrieving, from the external database by the computer-controlled mobile device, configuration information that details information regarding a configuration of the passenger transportation system; requesting, by the computer-controlled mobile device under consideration of the configuration information, commissioning information which details information regarding parameters that must be set within the scope of a commissioning of the passenger transportation system; and transmitting the commissioning information to the controller controlling the passenger transportation system. As a result, a commissioning process can be significantly simplified and is less susceptible to faults.

16 Claims, 1 Drawing Sheet

(56) References Cited

U.S. PATENT DOCUMENTS

| | | | | |
|---|---|---|---|---|
| 2012/0130567 | A1 | 5/2012 | Noffsinger et al. | |
| 2015/0142264 | A1 | 5/2015 | Gormley | |
| 2018/0162685 | A1* | 6/2018 | Mustonen | E05F 15/00 |
| 2020/0048046 | A1* | 2/2020 | Li | B66B 1/3423 |
| 2020/0109029 | A1* | 4/2020 | Pahlke | B66B 5/0087 |

FOREIGN PATENT DOCUMENTS

| | | | | |
|---|---|---|---|---|
| CN | 105645202 | A | 6/2016 | |
| CN | 105923476 | A | 9/2016 | |
| CN | 107738966 | A | 2/2018 | |
| CN | 109071164 | A | 12/2018 | |
| DE | 102016004422 | A1 | 2/2017 | |
| EP | 0615945 | A1 | 9/1994 | |
| EP | 3009389 | A1 | 4/2016 | |
| EP | 3228576 | A1 | 10/2017 | |
| EP | 3398901 | A1 | 11/2018 | |
| EP | 3617112 | A3 * | 5/2020 | B66B 1/3407 |
| WO | 2010017872 | A1 | 2/2010 | |
| WO | 2013038060 | A1 | 3/2013 | |
| WO | 2014200464 | A1 | 12/2014 | |
| WO | 2016109231 | A2 | 7/2016 | |
| WO | WO-2017220678 | A1 * | 12/2017 | |
| WO | WO-2020079310 | A1 * | 4/2020 | B66B 1/3407 |
| WO | WO-2020079311 | A1 * | 4/2020 | B66B 1/3446 |

* cited by examiner

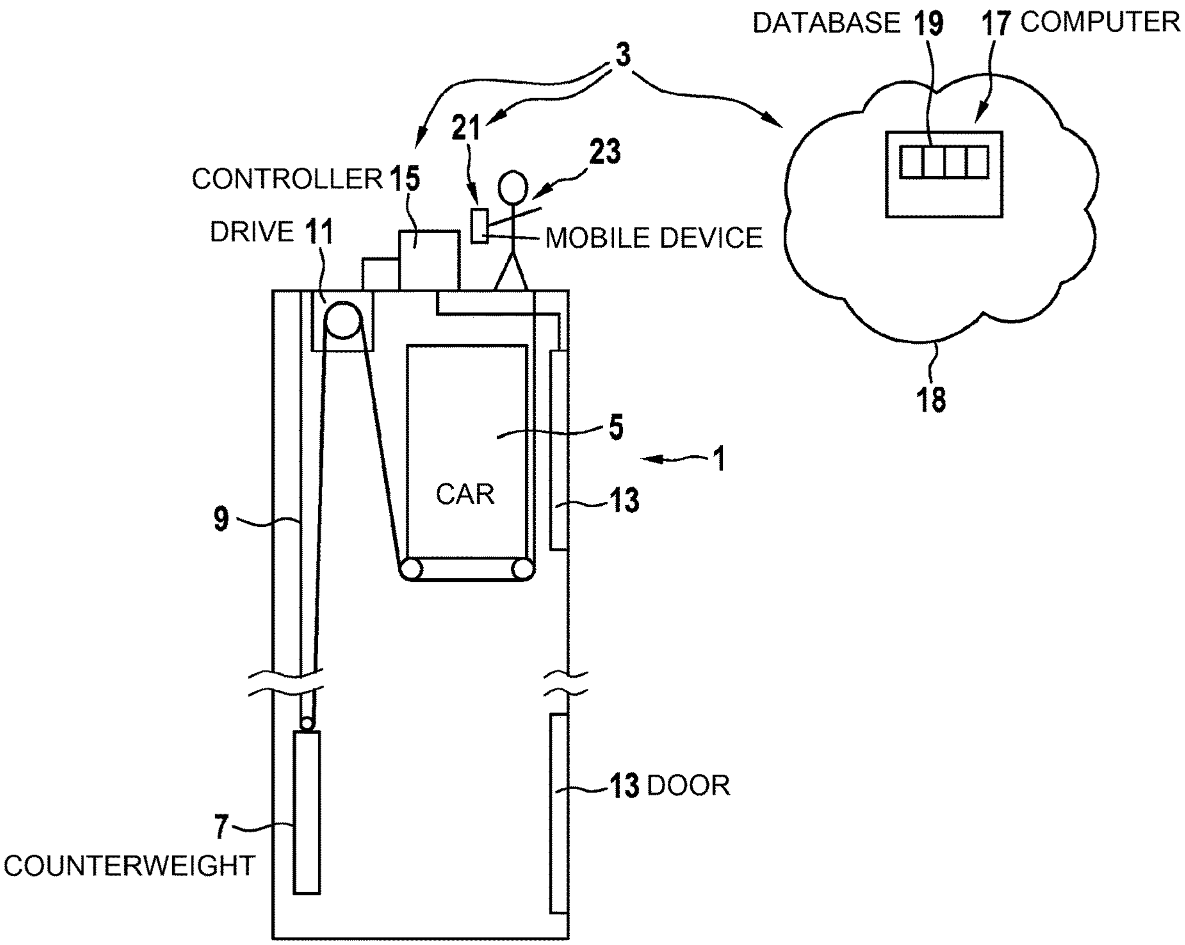
DATABASE 19
17 COMPUTER
3
21
23
CONTROLLER 15
DRIVE 11
MOBILE DEVICE
18
5
CAR
1
13
9
13 DOOR
7
COUNTERWEIGHT

METHOD AND APPARATUS FOR COMMISSIONING A PASSENGER TRANSPORTATION SYSTEM

FIELD

The present invention relates to a method and an apparatus designed to implement said method for commissioning a passenger transportation system.

BACKGROUND

Passenger transportation systems, such as elevators, escalators or moving walkways, are in general permanently installed in structures and are used to transport people vertically and/or horizontally in the structures.

Due to varying local conditions in different structures and different requirements for functions to be fulfilled by a passenger transportation system, passenger transportation systems used for different purposes can differ considerably, in particular with regard to the components installed therein and/or the way in which these components are operated.

For example, an elevator to be used in a high building can differ from an elevator to be used in a lower building with regard to many properties and components, i.e., for example, with regard to the size of an elevator car, a weight of a counterweight, a length of rope- or belt-like suspension elements, a performance of a drive machine, a dimensioning of brakes, a number of anchors, etc. The way in which the components of the elevator are installed and operated can also differ depending on the location and/or the intended use.

When planning a passenger transportation system, it is first configured with regard to the components to be provided therein. Among other things, local conditions such as those prevailing in the structure accommodating the passenger transportation system, local regulations which specify, for example, which safety precautions must be realized in the passenger transportation system, as well as individual user requests which, for example, indicate which conveying capacities the passenger transportation system should provide and/or which comfort functions must be provided, are taken into account. Information that reflects a configuration of the passenger transportation system resulting therefrom can be stored, for example, in a type of configuration list or bill of materials (BOM) in which, among other things, all components and parts to be included in the passenger transportation system are specified, possibly with additional specifications of further functional and/or structural properties of said components and parts.

After all components and parts have been installed in the passenger transportation system and before the passenger transportation system is put into operation, a so-called commissioning of the passenger transportation system usually takes place. During this commissioning, the special configuration of an individual passenger transportation system with regard to the components and parts it contains is prepared for its intended use and operation. For example, the individual components and parts must be suitably adapted with regard to their respective properties and functions in order to be able to jointly implement actions for the entire passenger transportation system.

For example, within the scope of a commissioning of an elevator system, properties of drive devices, braking devices, elevator doors, control devices, warning or alarm devices, etc. to be provided therein can be set in the above-mentioned example for a suitable interaction and for implementing overall properties to be achieved for the elevator system. In particular, properties of an elevator controller that controls the various components acting in the elevator system and coordinates their operation with one another should be suitably set within the scope of the commissioning.

Conventionally, the commissioning of a passenger transportation system is a very elaborate process in which well-trained personnel has to carry out a multiplicity of complex and possibly interdependent work steps. The commissioning of the passenger transportation system can therefore be associated with significant costs and expenditure of time. Furthermore, due to the complexity of a commissioning process, the risk of faults occurring which can endanger the operation, the integrity or even the safety of the passenger transportation system can be significant.

SUMMARY

Among other things, there can be a need for a method and an apparatus that can be used to implement said method, by means of which a commissioning of a passenger transportation system can be carried out in a simplified, faster, more cost-effective manner and/or with a reduced risk of faults. Furthermore, there can be a need for computer program products, by means of which a programmable commissioning arrangement can be prompted to carry out embodiments of the method, as well as for a computer-readable medium having such a computer program product stored therein.

Such a need can be met by the subject matter according to any of the advantageous embodiments defined in the following description.

According to a first aspect of the invention, a method for commissioning a passenger transportation system is proposed. The commissioning is supported here by a mobile device which is computer-controlled from an application and which is configured to exchange data both with a programmable controller controlling the passenger transportation system and with an external database in which configuration information regarding configurations of a plurality of passenger transportation systems is stored. The method comprises at least the following method steps, preferably in the specified order: retrieving, from the external database by the computer-controlled mobile device, configuration information which details information regarding a configuration of the passenger transportation system; requesting, by the computer-controlled mobile device under consideration of the configuration information, commissioning information which details information regarding parameters that must be set within the scope of a commissioning of the passenger transportation system; and transmitting the commissioning information to the controller controlling the passenger transportation system.

According to a second aspect of the invention, a commissioning arrangement for commissioning a passenger transportation system is proposed. The commissioning arrangement has at least the following components:

- a programmable controller controlling the passenger transportation system;
- a computer having an external database stored therein, in which configuration information regarding configurations of a plurality of passenger transportation systems is stored; and
- a mobile device which is computer-controlled from an application.

In this case, the commissioning arrangement is configured to carry out or control a method according to an embodiment of the first aspect of the invention.

According to a third aspect of the invention, a computer program product is proposed having computer-readable instructions which, when executed on a computer-controlled commissioning arrangement according to an embodiment of the second aspect of the invention, prompt said commissioning arrangement to carry out or control a method according to an embodiment of the first aspect of the invention.

According to a fourth aspect of the invention, a computer program product is proposed having computer-readable instructions which, when executed on a computer-controlled mobile device, prompt the mobile device to carry out or control a method according to an embodiment of the first aspect of the invention within the scope of a cooperation with further components of a commissioning arrangement according to an embodiment of the second aspect of the invention.

According to a fifth aspect of the invention, a computer-readable medium is proposed, having a computer program product according to an embodiment of the third or fourth aspect of the invention stored therein.

Possible features and advantages of embodiments of the invention can be considered, among others and without limiting the invention, to be based upon the concepts and findings described below.

As already indicated above, the commissioning of passenger transportation systems has so far been a demanding task that requires both considerable training and experience from the technician performing the commissioning and a considerable expenditure of time. Furthermore, a multiplicity of different pieces of information regarding the passenger transportation system to be commissioned must be available, which often leads to queries at a manufacturer of the passenger transportation system and/or errors in the transmission of such information can occur.

In particular, it is customary in the case of passenger transportation systems to provide a controller which controls the functions of the passenger transportation system and its components, and a commissioning of the passenger transportation system must be carried out via said controller. So far, this controller has mostly had an integrated human-machine interface (HMI), by means of which a technician can carry out the commissioning. Said human-machine interface usually has a display that can be used to indicate which type of commissioning information must currently be requested. Furthermore, the human-machine interface mostly had a few input keys with which the technician could select a type of commissioning information that was currently to be requested and via which the technician could then enter requested parameters for said commissioning information.

For example, a display, usually small in practice, could be used to indicate that the type of commissioning information to be currently requested is the number of floors at which an elevator car of an elevator system can stop. The technician can then enter the number of floors existing in the elevator system to be commissioned and then switch, for example, to requesting a desired speed at which an elevator car door is to be opened on one of the floors as the next type of commissioning information.

However, handling such a relatively simple human-machine interface is in many cases cumbersome. In particular, it can be laborious for the technician to navigate a multiplicity of theoretically possible types of commissioning information in order to reach the information that is currently supposed to be set. Furthermore, it can be time-consuming to then correctly enter the commissioning information using the simple human-machine interface. In addition, the technician must have been trained beforehand as to how specific parameters in the passenger transportation system can be determined or measured in order to then be able to transmit them as commissioning information to the controller of the passenger transportation system using the HMI. Finally, the commissioning carried out by the technician usually had to be checked and approved by a further certified technician, i.e., for example, a technician from the manufacturer of the passenger transportation system, before the passenger transportation system could then be put into operation. Overall, the process of commissioning was thus elaborate and/or susceptible to faults.

In short, it is therefore proposed in the approach presented herein that the commissioning of a passenger transportation system is supported by a computer-controlled mobile device such as, for example, a smartphone, a tablet, a notebook, a laptop, or the like. For this purpose, the mobile device can be portable such that a technician can easily carry it along. An application ("app") specifically programmed for this purpose can be run on such a device. With this application and the use of wired and/or wireless data communication options that are typically available to a modern computer-controlled mobile device, the device can be configured in particular to be able to exchange data and/or information both with a programmable controller controlling the passenger transportation system and with an external database. In this case, the mobile device can not only serve as an outsourced human-machine interface for the controller of the passenger transportation system but also support or simplify the process of commissioning under consideration of so-called configuration information from which information regarding a configuration of the passenger transportation system can be derived when requesting commissioning information. As a result, the requesting of the commissioning information can not only be carried out in a more targeted manner, but the technician performing the commissioning can also be given further assistance by means of the mobile device and the commissioning process can thus be made simpler and/or less susceptible to faults.

The programmable controller can be designed essentially similar to conventional controllers of passenger transportation systems, i.e., it has essentially the same hardware and/or it can implement essentially the same scope of functions. In addition, the programmable controller and the mobile device should be able to exchange data with one another. For this purpose, suitable data communication interfaces can be provided on both devices. For example, an interface can be provided on each of the two devices in order to be able to communicate wirelessly via radio, in particular via Bluetooth or, more preferably, via BLE (Bluetooth Low Energy). In this way, data can be transmitted from the controller of the passenger transportation system to the mobile device. For example, information can be transmitted as to what type of commissioning information is currently to be requested, so that this information can be output via the mobile device, i.e., for example, through prompts on its display. Data can also be transmitted from the mobile device to the controller of the passenger transportation system. For example, requested commissioning information which was entered, for example, by a technician on the mobile device or which was retrieved by the mobile device from other information sources, can be transmitted to the controller of the passenger transportation system.

The external database can be stored in a computer, a server or a cloud away from the passenger transportation system. For example, the external database can be stored in a cloud operated by a manufacturer of the passenger transportation system. The configuration information regarding a plurality of passenger transportation systems can be stored in the external database. This configuration information can, for example, provide information about which components were used in a passenger transportation system and/or have been planned for the passenger transportation system and/or how such components can be configured by suitable commissioning.

Using the options of being able to communicate directly with the controller of the passenger transportation system via the mobile device and being able to retrieve configuration information from the external database, the method proposed herein for commissioning the passenger transportation system can be carried out, for example, as follows:

At first, configuration information is retrieved from the external database via the mobile device, which provides information about the present passenger transportation system to be commissioned. This enables the mobile device to gain knowledge about which components are installed in the passenger transportation system or at least were planned for said passenger transportation system.

Under consideration of said configuration information, the commissioning information can then be requested using the mobile device. In this case, the commissioning information details information regarding parameters that must be set within the scope of the commissioning of the passenger transportation system. In other words, the commissioning information details which parameters must be transmitted to the controller of the passenger transportation system within the scope of its commissioning.

Finally, the commissioning information is transmitted from the mobile device to the controller of the passenger transportation system, so that it can be set or stored in said controller and thereby effect the commissioning of the passenger transportation system.

The fact that the previously retrieved configuration information is taken into account when requesting the commissioning information can be used, for example, to intelligently support the technician in entering such commissioning information.

For example, according to one embodiment of the invention, the configuration information can detail which components were ordered to construct the passenger transportation system. During the requesting of the commissioning information, the computer-controlled mobile device can subsequently only request commissioning information regarding which of the ordered components must be set within the scope of the commissioning of the passenger transportation system.

In other words, the configuration information to be taken into account during commissioning can be derived from planning data detailing which components have been planned for constructing the passenger transportation system and have thus been ordered, for example, from a manufacturer of the passenger transportation system or its suppliers. When planning a passenger transportation system, it is typically very precisely analyzed which spatial, functional and/or customer-desired requirements the passenger transportation system must meet, and the passenger transportation system with all of its components is then configured accordingly. The configuration information usually comprises a bill of materials (BOM) detailing which components must be installed in the passenger transportation system, possibly how many such components must be installed, which physical and/or functional properties such components should have, etc.

Based on the knowledge from such configuration information, it is then possible during the commissioning method described herein to only request commissioning information which is required in order to be able to suitably set the components ordered in the specific case via the controller of the passenger transportation system.

By contrast, it was customary for the conventional commissioning of passenger transportation systems that a multiplicity of different commissioning information could be requested via the controller of the passenger transportation system. The controller was thus designed such that it could be used for different configurations of the passenger transportation system or for different intended uses. Accordingly, it was in principle also possible via the controller to request commissioning information that was not relevant for a specific passenger transportation system to be commissioned, for example, because certain components were not used therein. For example, a controller was basically able to commission functions of a plurality of doors provided in an elevator car, wherein elevator systems only actually have a plurality of car doors in a few cases, so that this commissioning option did not have be used in all other cases. Accordingly, in the case of conventional commissioning, for example, a technician had to know in advance which components were actually installed in the passenger transportation system in order to then be able to select, on the basis of this knowledge, on the controller of the passenger transportation system which commissioning information actually had to be entered in the specific case. For this prior knowledge, the technician had to be suitably trained and provided with configuration information in advance. In addition, the technician may have had to laboriously navigate through different commissioning options during the commissioning process in order to be able to enter actually required commissioning information, which could result in additional effort. In addition, this could be made more difficult by the previously often cumbersome handling of a human-machine interface on the controller of the passenger transportation system.

In order to largely overcome the above-mentioned complications, it is therefore proposed for the commissioning method described herein to configure the computer-controlled mobile device used for requesting and transmitting the commissioning information such that it largely or completely automatically selects the commissioning information that is necessary to be able to suitably set the components ordered for the specific passenger transportation system within the scope of the commissioning, and then actually only requests said commissioning information. In this way, it can be avoided that a technician has to laboriously navigate through different commissioning options and/or, in the specific case, enters superfluous commissioning information.

According to one embodiment of the invention, a manner in which the commissioning information is requested can be dependent on an identity of a technician carrying out the commissioning.

As will be explained in more detail below, the identity of the technician supposed to carry out the commissioning can be known in advance or during the commissioning method. On the basis of the knowledge about said identity, the commissioning method and in particular the requesting of the commissioning information can be adapted to properties of the technician thus known.

For example, the qualifications of the technician can be known. Depending on whether the technician is more or less qualified to carry out a commissioning, the commissioning method can be suitably adapted. For example, when requesting the commissioning information, a less qualified technician can be provided with more instructions on how this commissioning information is to be determined and/or entered than would be provided for a more qualified technician.

Furthermore, it can be known which language the technician understands, and instructions regarding the requesting of the commissioning information can then be transmitted to said technician, for example, in said language.

Furthermore, according to one embodiment of the invention, a selection regarding a decision as to which commissioning information is requested can depend on an identity of a technician carrying out the commissioning.

For example, it can be provided that an entire commissioning should not be carried out by a single technician. Instead, simple steps can be performed by a less qualified technician and a more qualified technician can then only perform the remaining steps. Based on the knowledge of the identity of the respective technician, it can in this case be advantageous to only have the commissioning information requested via the mobile device, which is to be determined in a method step to be carried out by the respective technician and transmitted to the controller of the passenger transportation system. Other commissioning information can then be requested by another technician at a different point in time. In this way, for example, the entire commissioning within the scope of job management in the method presented herein can be suitably divided among different technicians.

According to one embodiment, the computer-controlled mobile device can be a personalized device of a technician carrying out the commissioning.

In other words, the mobile device can be the property or at least in possession of the technician carrying out the commissioning. For example, the mobile device can be a smartphone to be used professionally and/or privately or a computer to be used professionally and/or privately by the technician. As a result, the identity of the technician can be indirectly deduced.

Alternatively or additionally, according to one embodiment of the invention, an identity of a technician carrying out the commissioning can be determined by requesting a person-specific authentication.

In other words, the mobile device can, for example, prompt the technician to provide authentication, i.e., to communicate his identity, for example, by entering a personalized identifier and/or by transmitting biometric information, for example, a personal fingerprint. With such an authentication, the identity of the technician can be established with a particularly high level of certainty. Subsequently, for example, requests regarding commissioning information, which can only be carried out by specific technicians, can be released and the relevant part of a commissioning can be carried out using the mobile device.

According to one embodiment of the invention, request information can additionally be output via the computer-controlled mobile device when requesting the commissioning information, said request information detailing as to how the commissioning information to be requested must be determined.

In other words, the technician using the mobile device can be provided with additional information with which, for example, it can be explained how specific commissioning information to be requested can or should be determined. For example, within the scope of the commissioning, it may be necessary to carry out measurements on the fully installed passenger transportation system to be commissioned and to enter resulting measured values as commissioning information and ultimately transmit them to the controller of the passenger transportation system. In this case, information, for example, on how these measurements must be carried out, what safety measures must be taken, how the measurement results must be interpreted, etc., can be transmitted to the technician as request information. The request information can also be stored in the external database in which the configuration information is stored. Alternatively, request information can be retrieved from other information sources, i.e., for example, via other databases or a cloud, for example, after the configuration information or at least information about a component of the passenger transportation system to be commissioned has been transmitted.

According to a specific embodiment, one type of output request information can in this case depend on an identity of a technician carrying out the commissioning.

For example, a manner or a level of detail of the request information to be output can depend on different factors which in turn can be influenced by the identity or the qualification of the technician carrying out the commissioning. For example, the request information to be output should be more detailed, the less qualified the acting technician is.

Within the scope of carrying out the commissioning method proposed herein, it is usually necessary to know which passenger transportation system is currently to be commissioned. Corresponding identity information regarding the identity of the passenger transportation system in question can be used, for example, in order to be able to retrieve from the external database the configuration information associated with said passenger transportation system.

The identity of the passenger transportation system to be commissioned can be determined in different ways. For example, a technician carrying out the commissioning can know this identity and, for example, enter it into the mobile device in advance. Alternatively, the mobile device can determine said identity of the passenger transportation system on the basis of other data, for example, on the basis of data that are stored in the passenger transportation system and can be retrieved by the mobile device.

According to one embodiment, identity information regarding an identity of the passenger transportation system can be determined based on an operational plan for a technician carrying out the commissioning. The configuration information can then be retrieved under consideration of said identity information.

In other words, operational plans can specify when a specific technician should visit and commission a specific passenger transportation system. Corresponding information can be stored in a database. Based on this, the identity of a passenger transportation system visited by a specific technician at a specific point in time can be known. In this way, the identity of the passenger transportation system can be determined in a very simple and automatable manner.

According to one embodiment of the invention, so-called execution information can be stored during the commissioning method or after completion of the commissioning method. Such execution information can contain at least one piece of information or several pieces of information regarding which commissioning information was requested, at what time the commissioning information was requested, at what time the commissioning information was transmitted to the controller, which technician requested the commissioning information and/or how many repetitions were carried out when the commissioning information was requested.

In other words, by means of the devices and apparatuses used, execution information can be recorded and stored with the proposed commissioning method, which contains information about how, when and/or by whom the entire commissioning or individual requests regarding commissioning information carried out in the process were carried out and/or which problems may have occurred and led to repetitions when the commissioning information was requested.

This execution information can subsequently be used, for example, in order to be able to analyze technical problems occurring in the passenger transportation system and, for example, to be able to check whether said problems were caused by faults during commissioning.

Alternatively or additionally, the execution information can be checked promptly, for example, to analyze whether the commissioning was carried out in accordance with the rules. In particular, for example, a more qualified technician who is supposed to accept the passenger transportation system and thereby check the previously executed commissioning can use the stored execution information to identify which requests regarding commissioning information were carried out and when, by whom and/or in what manner this commissioning information was requested.

Further alternatively or additionally, the execution information can be used, for example, in order to be able to evaluate or check the commissioning work carried out by a technician.

For example, the execution information can be transmitted to and stored in the external database in which the configuration information is stored. Alternatively, the execution information can be transmitted to and stored in another database, for example, in a database set up for monitoring purposes and/or maintenance purposes by a manufacturer or a maintenance service provider for the passenger transportation system. As a further alternative, it would be possible to store the execution information in the controller of the passenger transportation system and/or in the mobile device, from where it could be retrieved at a later time if required.

According to one embodiment, additional component information regarding a component actually installed in the passenger transportation system can be determined and compared with configuration information regarding the component when the proposed commissioning method is carried out.

In other words, if a technician is already visiting a passenger transportation system for the purpose of commissioning, said technician can determine which components have actually been installed in the passenger transportation system. It is possible that these actually installed components differ from components planned during a planning phase and thus from components mentioned in the configuration information, for example, because an originally planned component was not available at the time the passenger transportation system was installed. If differences arise when comparing the actually installed components with the configuration information, it can be taken into account during the commissioning itself. For example, commissioning information can be requested under consideration of the component information regarding the components actually installed. In addition, for example, the configuration information in the external database can be corrected or updated.

Embodiments of the described commissioning method can advantageously be carried out with a commissioning arrangement according to an embodiment of the second aspect of the invention. This commissioning arrangement has a plurality of components. In particular, it contains the programmable controller that can control the passenger transportation system, a computer having an external database stored therein, in which the configuration information of a plurality of passenger transportation systems is stored, and the computer-controlled mobile device which is enabled in particular by means of the application specifically programmed for this purpose to carry out essential steps of the commissioning method such as, in particular, retrieving the configuration information and requesting the commissioning information under consideration of the configuration information.

Such a commissioning arrangement can be enabled, in particular by a computer program product according to the third aspect of the invention, to carry out or control an embodiment of the commissioning method described herein. In this case, the computer program product can consist of a plurality of parts which can be executed partly in the controller of the passenger transportation system, partly in the computer storing the external database, and partly in the mobile device. Due to a corresponding interaction of the individual components, programmed by the respective parts of the computer program product, these components as a whole can carry out or control the commissioning method.

As one part of such an overall computer program product, a computer program product according to the fourth aspect of the invention can be designed, when executed on the computer-controlled mobile device, to prompt said mobile device to carry out or control the steps to be carried out by the mobile device within the scope of the commissioning method described herein. In other words, the computer program product of the fourth aspect of the invention can be viewed as the application, by means of which the mobile device is programmed in order to be able to carry out its task in the commissioning method described.

The computer program products can be programmed in any computer language.

The computer program products can each be stored in any computer-readable medium. For example, a computer program product can be stored on an easily portable computer-readable medium, such as a flash memory, a CD, a DVD, or the like. Alternatively, a computer program product can be stored on a permanently installed computer or server and downloaded therefrom, for example, via a network such as the Internet. In particular, the computer program product can be stored on computers that are part of a cloud.

It must be noted that some of the possible features and advantages of the invention are described herein with reference to different embodiments of both the commissioning method and the commissioning arrangement. A person skilled in the art will recognize that the features can be suitably combined, adapted or exchanged in order to arrive at further embodiments of the invention.

In the following, embodiments of the invention will be described with reference to the accompanying drawing, wherein neither the drawing nor the description are intended to be interpreted as limiting the invention.

DESCRIPTION OF THE DRAWINGS

FIG. 1 shows an elevator system having a commissioning arrangement for carrying out a commissioning method according to one embodiment of the invention.

The FIGURE is merely schematic and not to scale.

DETAILED DESCRIPTION

FIG. 1 shows a passenger transportation system 1 in the form of an elevator system. The elevator system has a multiplicity of components, for example, an elevator car 5, a counterweight 7, belt-like suspension elements 9, a drive machine 11, elevator doors 13, etc. Some of the components of the elevator system 1 are controllable and are controlled by a controller 15, wherein a manner in which the controller 15 controls the components individually can depend on properties of these components and/or other components present in the passenger transportation system 1.

In order to adapt the elevator system to the prevailing conditions in a building accommodating said elevator system and to implement the desired functionalities, the elevator system was suitably configured in a planning phase. Among other things, suitable components were selected for this purpose. Corresponding configuration information was stored in an external database 19 in a computer 17. The computer 17 can be arranged remotely from the elevator system, for example, at a manufacturer of the elevator system or as part of a cloud 18.

After the elevator system has been installed and before it can be put into operation, it must be commissioned. For this purpose, commissioning information must be entered into the controller 15, in particular in order to enable the controller 15 to control the components of the elevator system in accordance with the specific conditions in the building and the desired functional requirements.

For this purpose, the controller 15, together with the external database 19 and a computer-controlled mobile device 21 on which an application designed for this purpose has been set up, forms a commissioning arrangement 3. By means of this commissioning arrangement 3, the commissioning of the elevator system can be carried out by a technician 23 simply, quickly and/or with a low risk of faults.

In this case, configuration information regarding the specific passenger transportation system 1 can first be retrieved from the external database 19 by means of the mobile device 21. Said configuration information can optionally be temporarily stored in the mobile device 21.

Taking into account this configuration information, the mobile device with the application running on said mobile device can then request commissioning information. For this purpose, for example, a display of the mobile device can show which commissioning information must currently be requested.

The application can act to the effect that only those pieces of configuration information are requested that are required for the specific passenger transportation system 1, as it is characterized by the configuration information, whereas other configuration information required for other passenger transportation systems but not relevant for the specific passenger transportation system to be commissioned 1 is not requested.

In order to support the technician 23 in determining the commissioning information, request information can additionally be output which can inform said technician regarding the manner in which the commissioning information to be requested can be determined.

Furthermore, information regarding the identity of the technician 23 can be used in the commissioning method, for example, in order to be able to transmit information to the technician 23, which is adapted to the person, in particular the qualification, language, etc., of said technician.

In addition and partly with a choice of words deviating from the wording previously used herein, possible properties, details and/or advantages of embodiments of the invention can be described as follows:

An underlying problem can be seen in the fact that until now, a very complex and old-fashioned process has been used for commissioning an elevator. In this case, the elevator had a unique configuration as ordered by a user. In particular, the introduction of a so-called scalable controller with a very different user interface and a different interaction paradigm, when compared to those which most technicians were used to, required considerable effort and training and also increased the likelihood of faults and thus costly quality problems.

It is therefore proposed to use a mobile device with an application specifically developed for this purpose, which is preferably wirelessly connected (for example, using BLE) to an elevator control system in order to initiate and carry out a commissioning using a user interface that is similar to an installation wizard. The mobile application has information (ordered hardware parts and options regarding the BOM configuration, ordered services) regarding the elevator to be commissioned, for example, from the order. It receives this information, for example, from a cloud in which, for example, details regarding the order are stored in an SAP database. Before the commissioning, the information is synchronized to the mobile device, so that it is available if network connectivity is only limited. However, it can also be received or updated on site, provided that network connectivity is available. The application intelligently guides the technician through the commissioning process and displays, for example, only steps or activities that are relevant for the specific elevator, whereas steps are skipped, for example, if a special option and thus hardware is not present, wherein alternatives depending, for example, on the presence of a special door or a special drive, are displayed. In this way, order and configuration details stored in a cloud are used advantageously. A status regarding hardware connected to a control security chain is also requested by the application from the controller and used advantageously to provide specific information and guidance. The application also highlights when components differ from what was ordered or are missing. The technician can then update the original order details and/or request delivery of the missing parts using the application. Instead of relying on the technician to know specific parameters and manually keying in items such as calibration values, data automation can be used (for example, calculating correct values in the application using time data in the mobile device, etc.). The technician will recognize how many steps have already been completed and, if allowed to do so, will carry out phases of the entire process according to the preferences of said technician. Individual method steps can also differ depending on the country in which the technician is located, the experience of the technician with elevator systems, etc.

A record can be kept of what was done during the commissioning process (for example, passed/failed), which parameters were changed, etc., so that there is evidence thereof, but also to update information in the cloud regarding the specific installation (to have current/correct information). If a problem occurs during commissioning (for example, a non-functioning piece of hardware is detected or is incorrect, etc.), the application can provide instructions on how this can be checked and resolved. This can be done, for example, by means of images with regions highlighted therein (for example, where a connection cable can be found, buttons to be pressed, etc.) or with short animations/videos. The rules for the commissioning process can be maintained in the cloud and updated regularly (in the event that problems have been identified or new hardware components have been used, etc.).

In the future, the user interface on the controller can preferably be completely eliminated and a mobile device, on which software for commissioning, configuring, diagnosing and/or problem solving, etc., is provided, can be relied on. Based on the users or even licensing models (in case of third party providers), the software can be updated more frequently, and a set of features can be limited.

With conventional systems, well-trained technicians had to carry out complex sequences of steps, as documented in commissioning documentation, using minimalistic and relatively cryptic user interfaces (LCD with a few lines and hardware buttons) on the controller. There was no specific adaptation of commissioning steps based on specific elevator configurations and/or ordered functionalities. A time-consuming and error-prone process was carried out that relied on existing expert resources and required intensive training to ensure qualitative results and avoid errors. A configuration was programmed on a chip card. In the event of errors or losses, a new chip card had to be ordered, updated and sent back to the location of the elevator system, which resulted in delays and additional costs.

By contrast, the approach presented herein allows for a significant reduction in the time required, for example, to commission an elevator. Furthermore, possibilities for making mistakes are reduced and/or faster solutions are offered. In addition, training costs and a dependency on well-trained resources can be reduced.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for commissioning a passenger transportation system supported by a mobile device that is computer-controlled from an application and is configured to exchange data both with a programmable controller controlling the passenger transportation system and with an external database in which database configuration information regarding configurations of a plurality of passenger transportation systems is stored, the method comprising the steps of:

- retrieving from the external database by the computer-controlled mobile device configuration information that details information regarding a configuration of the passenger transportation system;
- requesting by the computer-controlled mobile device, under consideration of the configuration information, commissioning information that details information regarding parameters that must be set within a scope of a commissioning of the passenger transportation system;
- prior to requesting the commissioning information, performing at least one of determining the commissioning information to be requested, determining a type of output of the requested commissioning information depending on an identity of a technician carrying out the commissioning, and selecting which commissioning information is requested depending on an identity of a technician carrying out the commissioning; and
- transmitting the commissioning information to the controller controlling the passenger transportation system.

2. The method according to claim 1 wherein the computer-controlled mobile device is a personalized device of a technician carrying out the commissioning.

3. The method according to claim 1 including determining an identity of a technician carrying out the commissioning by requesting a person-specific authentication.

4. The method according to claim 1 including outputting request information via the computer-controlled mobile device when requesting the commissioning information, the request information detailing as to how the commissioning information to be requested must be determined.

5. The method according to claim 4 wherein a type of the request information depends on an identity of a technician carrying out the commissioning.

6. The method according to claim 1 including determining identity information regarding an identity of the passenger transportation system based on an operational plan for a technician carrying out the commissioning, and wherein the configuration information is retrieved under consideration of the identity information.

7. The method according to claim 1 including storing execution information that contains at least one piece of information regarding which commissioning information was requested, at what time the commissioning information was requested, —at what time the commissioning information was transmitted to the controller, which technician requested the commissioning information, and how many repetitions were carried out when the commissioning information was requested.

8. The method according to claim 1 including determining component information regarding a component actually installed in the passenger transportation system and comparing the component information with configuration information regarding the component.

9. A commissioning arrangement for commissioning a passenger transportation system, wherein the commissioning arrangement comprises:

- a programmable controller controlling the passenger transportation system;
- a computer having an external database stored therein, the external database containing configuration information regarding configurations of a plurality of passenger transportation systems;
- a mobile device computer-controlled from an application; and
- wherein the commissioning arrangement is adapted to carry out or control the method according to claim 1.

10. A computer program product having computer-readable instructions that, when executed by the computer-controlled commissioning arrangement according to claim 9, prompt the commissioning arrangement to carry out or control the method for commissioning.

11. A non-transitory computer-readable medium having the computer program product according to claim 10 stored therein.

12. A computer program product having computer-readable instructions that, when executed on a computer-controlled mobile device, prompt the mobile device to carry out or control the method according to claim 1 in cooperation with a programmable controller controlling the passenger transportation system and a computer having an external database stored therein, the external database containing configuration information regarding configurations of a plurality of passenger transportation systems.

13. A non-transitory computer-readable medium having the computer program product according to claim 12 stored therein.

14. A method for commissioning a passenger transportation system supported by a mobile device that is computer-controlled from an application and is configured to exchange data both with a programmable controller controlling the passenger transportation system and with an external database in which database configuration information regarding configurations of a plurality of passenger transportation systems is stored, the method comprising the steps of:

retrieving from the external database by the computer-controlled mobile device configuration information that details information regarding a configuration of the passenger transportation system;

requesting by the computer-controlled mobile device, under consideration of the configuration information, commissioning information that details information regarding parameters that must be set within a scope of a commissioning of the passenger transportation system;

wherein the configuration information details which components have been ordered to construct the passenger transportation system, and wherein, during the requesting of the commissioning information, the computer-controlled mobile device only requests commissioning information regarding which of the ordered components must be set within the scope of the commissioning of the passenger transportation system; and transmitting the commissioning information to the controller controlling the passenger transportation system.

15. A method for commissioning a passenger transportation system supported by a mobile device that is computer-controlled from an application and is configured to exchange data both with a programmable controller controlling the passenger transportation system and with an external database in which database configuration information regarding configurations of a plurality of passenger transportation systems is stored, the method comprising the steps of:

retrieving from the external database by the computer-controlled mobile device configuration information that details information regarding a configuration of the passenger transportation system;

requesting by the computer-controlled mobile device, under consideration of the configuration information, commissioning information that details information regarding parameters that must be set within a scope of a commissioning of the passenger transportation system;

transmitting the commissioning information to the controller controlling the passenger transportation system; and performing at least one of:

determining an identity of a technician carrying out the commissioning by requesting a person-specific authentication;

outputting request information via the computer-controlled mobile device when requesting the commissioning information, the request information detailing as to how the commissioning information to be requested must be determined;

determining identity information regarding an identity of the passenger transportation system based on an operational plan for a technician carrying out the commissioning, and wherein the configuration information is retrieved under consideration of the identity information;

storing execution information that contains at least one piece of information regarding which commissioning information was requested, at what time the commissioning information was requested, —at what time the commissioning information was transmitted to the controller, which technician requested the commissioning information, and how many repetitions were carried out when the commissioning information was requested; and determining component information regarding a component actually installed in the passenger transportation system and comparing the component information with configuration information regarding the component.

16. The method according to claim 15 wherein a type of the request information depends on an identity of a technician carrying out the commissioning.

* * * * *